(12) United States Patent
Nishi et al.

(10) Patent No.: US 8,073,567 B2
(45) Date of Patent: Dec. 6, 2011

(54) PRODUCTION SYSTEM PROVIDED WITH A PRODUCTION CONTROL APPARATUS

(75) Inventors: Hiroji Nishi, Yamanashi (JP); Jun Mizuno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 493 days.

(21) Appl. No.: 12/340,784

(22) Filed: Dec. 22, 2008

(65) Prior Publication Data

US 2009/0198370 A1 Aug. 6, 2009

(30) Foreign Application Priority Data

Jan. 31, 2008 (JP) .................................. 2008-022027

(51) Int. Cl.
*G05B 19/04* (2006.01)
(52) U.S. Cl. ........ 700/247; 700/108; 700/112; 700/245; 700/248; 318/568.14
(58) Field of Classification Search .................... 700/95, 700/108, 112–114, 182, 245, 247–250, 257; 318/568.14
See application file for complete search history.

(56) References Cited

U.S. PATENT DOCUMENTS

| | | | | |
|---|---|---|---|---|
| 4,633,385 A | * | 12/1986 | Murata et al. .................... | 700/86 |
| 5,019,762 A | * | 5/1991 | Kato .............................. | 700/247 |
| 5,742,824 A | * | 4/1998 | Kosaka .......................... | 718/106 |
| 5,825,981 A | * | 10/1998 | Matsuda ........................ | 700/248 |
| 5,984,499 A | * | 11/1999 | Nourse et al. ..................... | 700/5 |
| 6,904,335 B2 | * | 6/2005 | Solomon ....................... | 700/247 |
| 2006/0015218 A1 | | 1/2006 | Nagatsuka et al. | |
| 2006/0276934 A1 | | 12/2006 | Nihei et al. | |
| 2007/0179671 A1 | * | 8/2007 | Arimatsu et al. ............. | 700/247 |

FOREIGN PATENT DOCUMENTS

| | | |
|---|---|---|
| EP | 1731273 | 12/2006 |
| JP | 2006031311 A | 2/2006 |
| JP | 2006-343828 | 12/2006 |

OTHER PUBLICATIONS

Soetens Pet Al: "Realt~me Hybrid Task-Based Control for Robots and Machine Tools" Robotics and Automation~2005. Proceedings of the 2005 IEEE International Conference on Barcelona, Spain Apr. 18-22, 2005~Piscataway, NJ, USA,IEEE, Apr. 18, 2005, pp. 259-264.*

Notice of Reasons for Rejection for JP 2008-022027 mailed Jun. 16, 2009.

* cited by examiner

*Primary Examiner* — Dave Robertson
(74) *Attorney, Agent, or Firm* — Lowe Hauptman Ham & Berner LLP

(57) ABSTRACT

A production control apparatus of a production system provided with a storing means for storing in advance a production system model comprised of workpiece information regarding workpieces and program information regarding a plurality of work programs of robots and a plurality of machining programs of machine tools, an updating means for updating the production system model based on run status signals showing run statuses of the robots and machines tools and workpiece signals from the detectors, and an instructing means for selecting one work program and one machining program based on the updated production system model and instructing running of the selected work program and work program to the robot and machine tool. Due to this, by calling up a work program of the robot etc. in accordance with the state of the production system, it is possible to change the program and restore the system from error.

5 Claims, 10 Drawing Sheets

| PROGRAM | LIST OF SIGNALS RELATING TO PROGRAMS C, E, F | | | |
|---|---|---|---|---|
| A | COVERAGE | SIGNAL | VIRTUAL VALUE | ACTUAL VALUE |
| B | | | | |
| C | PLC | DO[1] | ON | ON |
| D | PLC | DO[3] | ON | OFF |
| E | RC1 | DI[4] | OFF | OFF |
| F | RC1 | DO[8] | ON | ON |
| G | RC1 | DI[9] | ON | ON |
| | RC2 | DI[1] | OFF | OFF |
| | RC2 | DI[2] | OFF | OFF |

PRODUCTION SYSTEM PROVIDED WITH A PRODUCTION CONTROL APPARATUS

RELATED APPLICATIONS

The present application is based on, and claims priority from, Japanese Application Number 2008-022027, filed Jan. 31, 2008, the disclosure of which is hereby incorporated by reference herein in its entirety.

BACKGROUND OF THE INVENTION

1. Field of the Invention

The present invention relates to a production system provided with an industrial robot and machine tool and a production control apparatus.

2. Description of the Related Art

In a production system comprised of an industrial robot (hereinafter referred to as a "robot") and a machine tool, the system behavior is defined by the cooperative operations of the robot and machine tool. This "cooperation", for example, means the robot sets a not yet machined workpiece in the machine tool, then the machine tool machines it, the machine tool finishes machining, then the robot takes out the finished machined workpiece. In addition to such simple cooperation, the cooperative operations include parallel operations where the time during which the machine tool is machining is utilized for the robot to transport the workpiece to be next machined.

To realize this cooperation, the robot and the machine tool can communicate in some form or another. The robot and machine tool may be made to directly communicate or the robot and machine tool may be connected to PLCs and be connected to each other through the PLCs.

In both cases, to realize cooperation between the robot and machine tool, a production control apparatus for obtaining a grasp of this cooperation is necessary. In the simplest mode, the robot performs the role of the production control apparatus. In this case, the robot sets a workpiece at the machine tool, then the robot instructs the machining to the machine tool, waits until the machining program ends at the machine tool, then takes out the workpiece. Further, when the machine tool performs the role of the production control apparatus, the machine tool instructs the robot to take out the machined workpiece and set an unmachined workpiece and starts machining after the robot work ends.

However, when the robot performs the role of the production control apparatus, the work program of the robot includes work on the robot itself and instructions to the machine tool, so the work program of the robot becomes complicated and changing it becomes difficult. In the same way as when the machine tool acts as the production control apparatus, the work program of the robot becomes simple, but the machining program of the machine tool becomes more complicated by that extent.

Therefore, to realize complicated behavior, it is preferable to provide an independent production control apparatus and make that production control apparatus issue instructions to the robot and machine tool. Due to this, both the work program of the robot and the machining program of the machine tool become simple.

Even in a production system comprised of one robot and one machine tool, the robot and machine tool can operate simultaneously, so it is difficult to realize the behavior of the robot and machine tool by a single program.

In a general production system comprised of a plurality of robots and a plurality of machine tools, it becomes more difficult to describe their behaviors. This is because in a production system where a plurality of robots and a plurality of machine tools can simultaneously operate, the number of states of the production system as a whole is expressed by the combination of the number of states of the individual robots and the number of states of the individual machine tools, so the number of states of the production system as a whole becomes enormous.

To solve this problem, in Japanese Patent Publication (A) No. 2006-343828, each work program of the robot is divided into certain units and a suitable work program is started up in accordance with the situation of the production system. With this method, a certain unit of the work program is linked with conditions for startup of this work program, so there is no need to obtain a grasp of the total number of states of the production system as a whole. Therefore, it becomes easy to newly add a work program to an existing production system or to change the work program.

However, with the system of Japanese Patent Publication (A) No. 2006-343828 linking a program and conditions under which that program can be run, it is not enough to enable a grasp of the states of the robot and machine tool forming the production system. In this case, it is necessary to obtain a grasp of not only the states of the robot and machine tool, but also the states of the jig and robot hand holding the workpiece. Further, particularly importantly, it is necessary to obtain a grasp of how a workpiece flows in the production system.

The importance of obtaining a grasp of the flow of a workpiece when an error occurs in the production system will be explained. For example, in a production system comprised of two robots, assume an operation where a robot $1a$ carries a workpiece from a table A to a table B and a robot $2a$ carries a workpiece from a table B to a table C. If the robot $1a$ correctly conveys the workpiece from the table A to the table B, the workpiece should be present on the table B.

However, after the conveyance by the robot $1a$, the workpiece may end up falling off the table B due to some sort of reason. In such a case, the robot $2a$ naturally cannot carry this workpiece, so this state becomes an error.

However, in a production system not obtaining a grasp of the flow of the workpiece, information of whether a workpiece should be present on the table B is not obtained from the start, so even if the workpiece falls from the table B, this will not be recognized and the robot $2a$ will move to obtain a nonexistent workpieces from the table B.

Even if providing the table B with some sort of sensor, if linked with a program whereby the robot $2a$ moves to pick up a workpiece when there is a workpiece at the table B, the robot $2a$ will never operate to pick up a nonexisting workpiece. However, in this case, there is no workpiece on the table B, so the production system will end up stopping operation there. At this time, despite the production system being in the error state, the two robots are both operating normally. That is, if just obtaining a grasp of the states of the robots, it is not possible to determine if an error has occurred in the production system.

Further, when error occurs due to such a workpiece not being present at the expected location, in a production system which cannot obtain a grasp of the flow of the workpiece, the means for clearing that error are not clarified. In the above-mentioned example, it is clear that the workpiece dropping off the table B is the cause of the error. Further, there are the following options for this cause: placing the workpiece back on the table B, removing the workpiece, or returning the workpiece to the table A.

The option of placing the workpiece back on the table B may appear to be the best, but depending on how the workpiece is placed on the table B, it may be impossible for the robot 2a to grasp the workpiece. Further, in the case of the options of removing the workpiece or returning the workpiece to the table A, in a production system unable to obtain a grasp of the flow of the workpiece, it is not possible to determine by what party other than the robot the workpiece is moved, therefore it is unclear if the production system will operate normally after that.

SUMMARY OF THE INVENTION

An object of the present invention is to provide a production system obtaining a grasp of the state of the production system including the flow of the workpiece and selecting the work program of the robot and/or the machining program of the machine tool in accordance with that state so as to facilitate changes in the program and restoration from error.

To achieve the above-mentioned object, according to a first aspect of the invention, there is provided a production control apparatus controlling a production process in the production system, at least one machine tool including a plurality of machining programs and machining a workpiece, at least one robot including a plurality of work programs, supplying a workpiece to the machine tool, and unloading the workpiece from the machine tool, at least one staging table on which a workpiece can be placed, at least one detector outputting a workpiece signal indicating if a workpiece is present at the staging table, and a communicating means for connecting the production control apparatus, the robot, the machine tool, and the detector, wherein, the production control apparatus is provided with a storing means for storing in advance a production system model comprised of workpiece information regarding the workpiece and program information regarding the plurality of work programs of the at least one robot and the plurality of machining programs of the at least one machine tool, an updating means for updating workpiece information and program information contained in the production system model stored in the storing means based on a run status signal received from the communicating means and showing a run status of the robot and the machine tool and a workpiece signal output from the detector, and an instructing means for selecting one work program from the plurality of work programs of the robot and one machining program from the plurality of machining programs of the machine tool based on the production system model updated by the updating means and instructs running of the selected work program and machining program through the communicating means to the robot and the machine tool.

According to a second aspect, there is provided the first aspect, wherein the production system is comprised of a plurality of the robots and a plurality of the machine tools, and the instructing means further selects one robot among the plurality of robots and one machine tool among the plurality of machine tools based on the production system model updated by the updating means and instructs running of the work program and machining program through the communicating means to the selected robot and machine tool.

According to a third aspect, there is provided the first or second aspect, wherein when the production system stops due to an error, the production control apparatus makes the production system operate again only when the program information in the production system model matches a newest run status signal received by the communicating means and the workpiece information in the production system model matches a newest workpiece signal received from the communicating means.

According to a fourth aspect, there is provided the third aspect, wherein the production control apparatus is provided with a displaying means for displaying the run status signal when the program information in the production system model and the newest run status signal do not match and displaying the workpiece signal when the workpiece information in the production system model and the newest workpiece signal do not match.

According to a fifth aspect, there is provided the third or fourth aspect, wherein the production control apparatus is provided with a changing means for changing the production system model and makes the production system operate again when the program information in the production system model and the newest run status signal match and the workpiece information in the production system model and the newest workpiece signal match due to the changing means.

BRIEF DESCRIPTION OF THE DRAWING

These objects, features, and advances of the present invention and other objects, features, and advantages will become clearer from the detailed description of typical embodiments of the present invention given with reference to the attached drawings, in which.

BEST MODE FOR CARRYING OUT THE INVENTION

Figure 1:
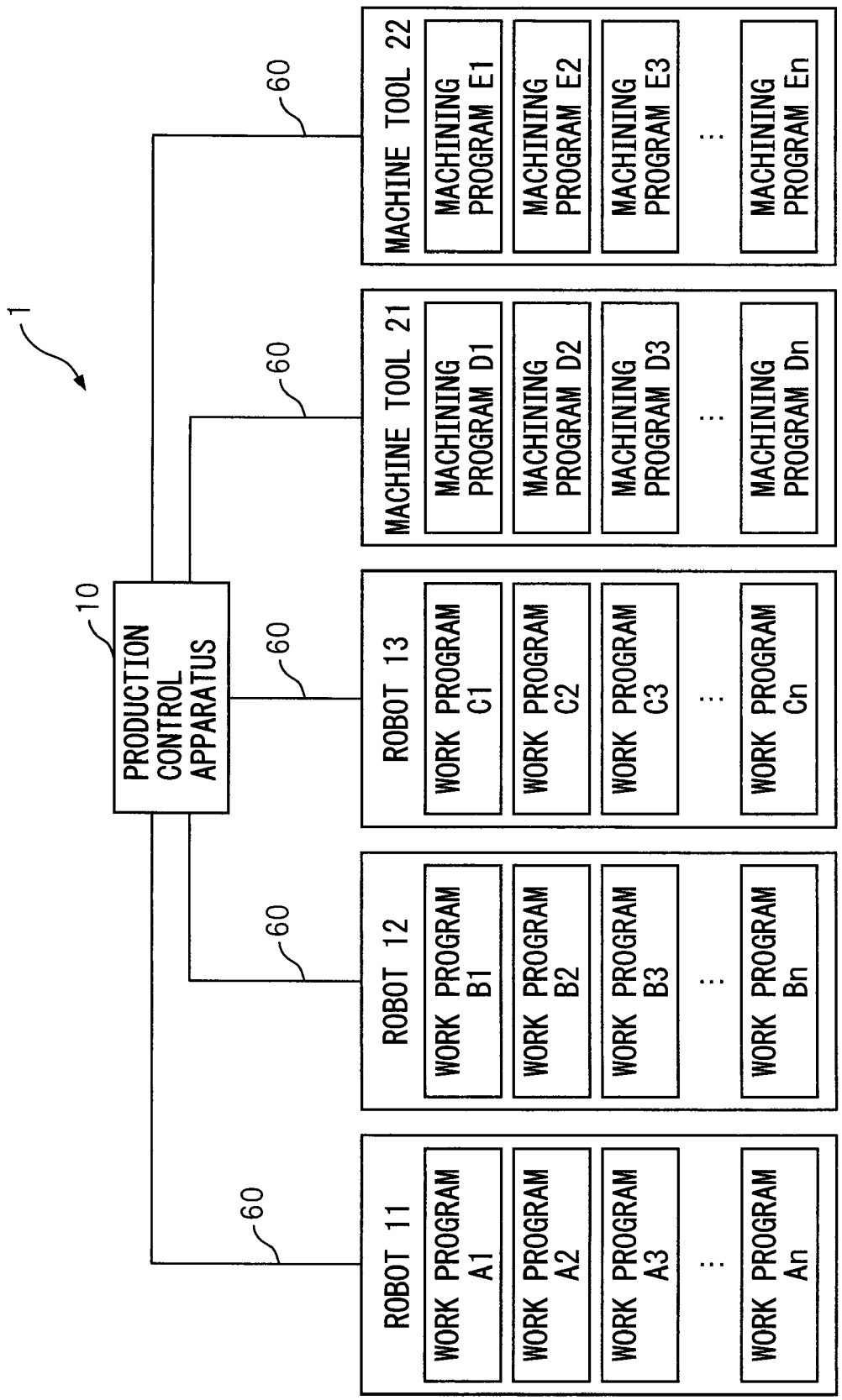
FIG. 1 is a schematic view of a production control apparatus, robot, and machine tool forming a production system.

Below, embodiments of the present invention will be explained with reference to the attached drawings. In the drawings, similar members are assigned similar reference numerals. To facilitate understanding, these drawings are suitably changed in scale.

Regarding Production System Model

Before explaining embodiments of the present invention, a method of expressing the behavior of the production system, that is, a production system model, will be obtained. The "behavior" shows how the production system operates. The production system operates by a plurality of work programs built into the robots forming these, the plurality of machining programs built in the machine tools, and the program built into the production control apparatus. Therefore, the behavior of the production system is determined by these programs. Expressing the behavior of the production system means expressing the operations of the programs.

Specifically, the production system model is comprised of workpiece information for a workpiece to be machined by the machine tool and program information regarding a plurality of work programs of at least one robot and a plurality of machining programs of at least one machine tool. Here, the workpiece information includes the type and number of workpieces and the machined states. Further, the program information includes the order of running the plurality of work programs and the plurality of machining programs.

FIG. 1 shows an example of a production control apparatus, robots, and machine tools forming a production system. This production system 1 includes three robots 11 to 13 for conveying the workpieces W, two machine tools 21 and 22 for machining the workpieces W, and the production control apparatus 10 for controlling cooperation among them.

These robots 11 to 13 store a plurality of programs A1 to An, B1 to Bn, and C1 to Cn describing the robot operations. These programs are called "work programs" in the present invention. Similarly, the machine tools 21 and 22 respectively store pluralities of machining programs D1 to Dn and E1 to En for machining workpieces W. The work programs and machining programs are both prepared by the preparer of the production system 1.

These robots 11 to 13, machine tools 21, 22, and production control apparatus 10 can communicate with each other by the communicating means 60. This communicating means 60 enables the production control apparatus 10 to instruct the robots 11 to 13 and machine tools 21, 22 to execute the work programs or machining programs. Conversely, the robots 11 to 13 and machine tools 21 and 22 can send to the production control apparatus 10 signals on the run statuses of the robots and machine tools at that time and signals of the run results of the work programs or machining programs. Note that for the purpose of simplification, in FIG. 2 and FIG. 3, reference numerals of the communicating means 60 are omitted.

Figure 2:
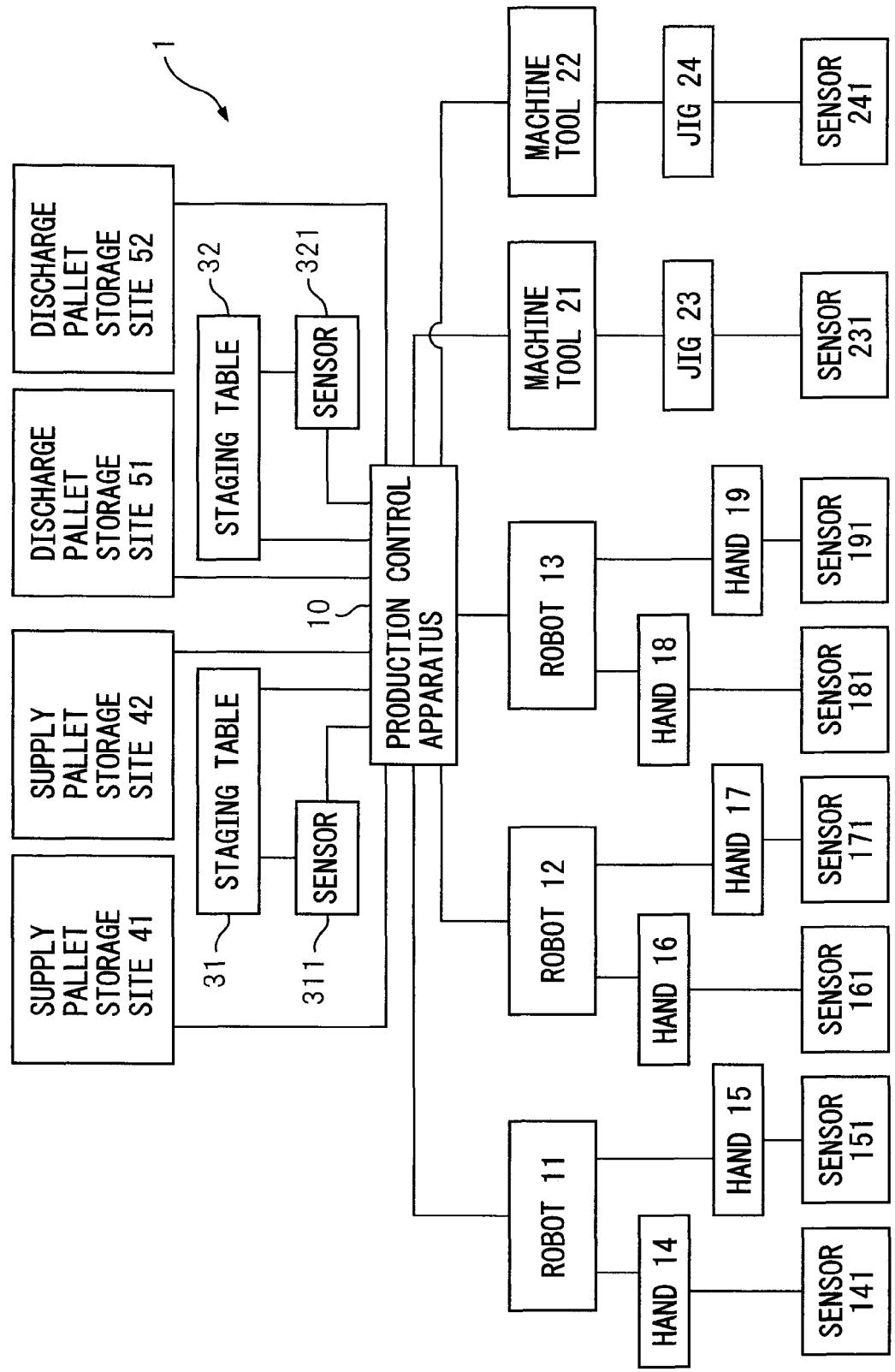
FIG. 2 is a view showing peripherals forming a production system.

The production system 1 further includes various peripherals and workpieces W processed by the production system 1. FIG. 2 shows peripherals of the production system illustrated in FIG. 1. The robots 11 to 13 have two hands 14 to 19 connected to them as peripherals. Further, the machine tools 21 and 22 respectively have jigs 23 and 24 attached to them.

As illustrated, the hands 14 to 19 and jigs 23 and 24 have sensors 141 to 191, 231, and 241 attached to them. These sensors can be used to detect if the hands 14 to 19 are holding workpieces W or if the jigs 23 and 24 are holding workpieces W. These sensors are usually connected to the robots 11 to 12 or the machine tools 21 and 22. In this production system 1, the signals of these sensors can be received by the production control apparatus 10 through the robots 11 to 13 or machine tools 21 and 22.

FIG. 2 shows further two staging table 31, 32 and four pallet storage sites 41, 42, 51, and 52. The staging tables 31, 32 are places for staging the workpieces W when a plurality of robots transfer workpieces W among them. These staging tables 31, 32 have sensors 311, 312 mounted on them. Using these sensors 311, 312, the production control apparatus 10 receives signals (workpiece signals) showing if workpieces W are placed at the staging tables 31, 32. The sensors 311, 312 are connected to the production control apparatus 10. The production control apparatus 10 can obtain a grasp of the presence/absence of workpieces W at the staging tables 31, 32.

The workpieces W supplied to and discharged from the production system are usually stored on pallets, containers, or other such storage members. FIG. 2 shows as an example two supply pallet storage sites 41, 42 storing pallets for supplying workpieces W and two discharge pallet storage sites 51, 52 for storing pallets for discharging workpieces. These pallet storage sites 41, 42 have sensors 411, 421 attached to them (see FIG. 3). The production control apparatus 10 can detect if the pallet storage sites 41, 42, 51, and 52 store pallets.

Figure 3:
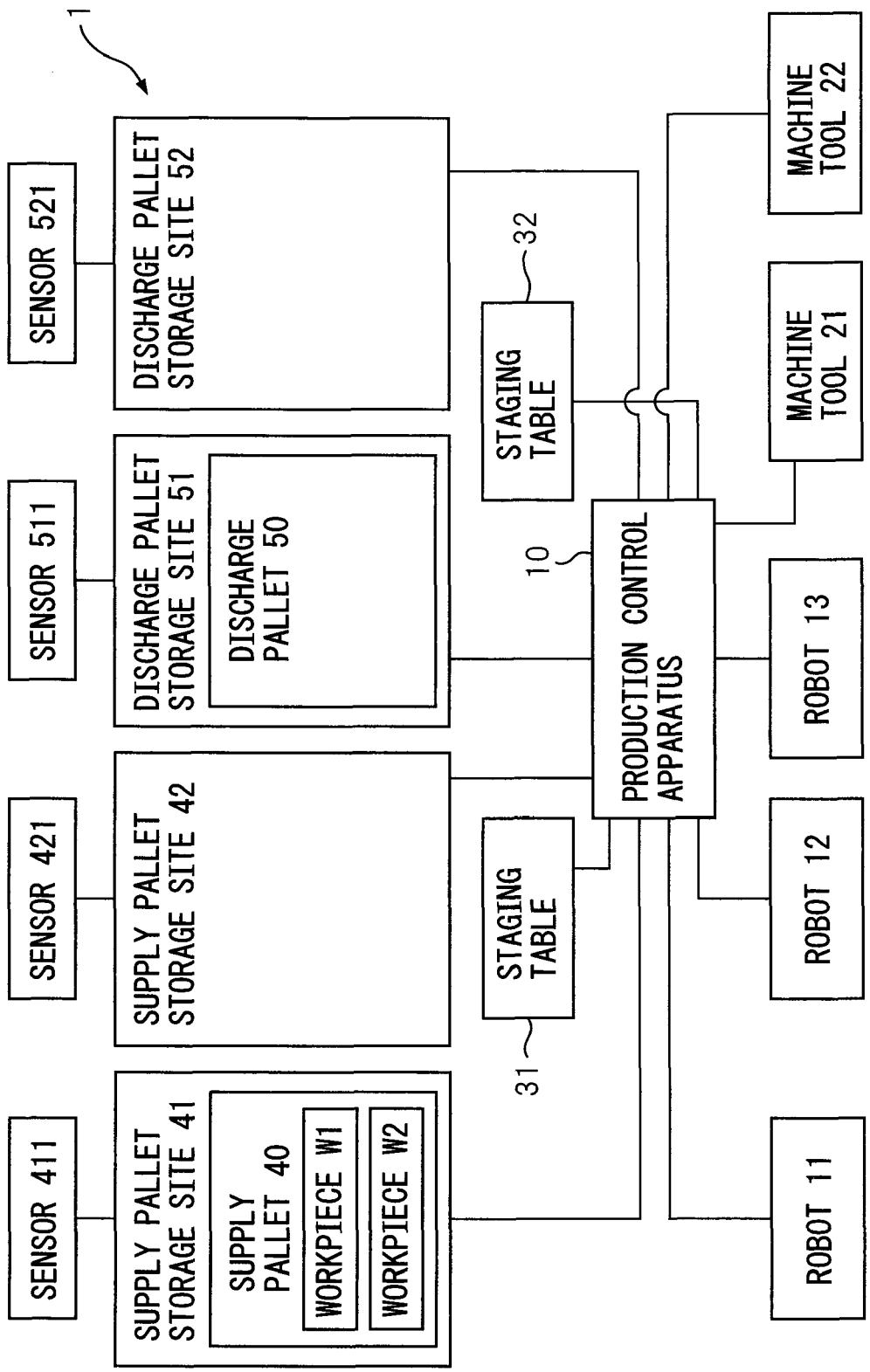
FIG. 3 is a view showing a production system including a workpiece handled by the production system.

The elements corresponding to the workpieces W also form parts of the production system 1. The production system 1 shown up to here plus workpieces W is shown in FIG. 3. In FIG. 3, a supply pallet 40 holding the workpiece W1 and workpiece W2 is stored at the supply pallet storage site 41. The discharge pallet storage site 51 stores an empty discharge pallet 50.

Here, the supply pallet 40 and the discharge pallet 50 are treated as corresponding to workpieces W in the present invention. These pallets 40 and 50 are simple containers of the workpieces W and are not machined. However, if considering the production system 1 as performing some sort of processing on input elements and then outputting them, the pallets 40 and 50 are also input and output, so the pallet 40, 50 can be treated as elements corresponding to the workpieces W. On the other hand, the pallet storage sites 41, 42, 51, 52 and the jigs 23 and 24 are not input or output, so are regarded as parts of the production system 1.

Figure 4:
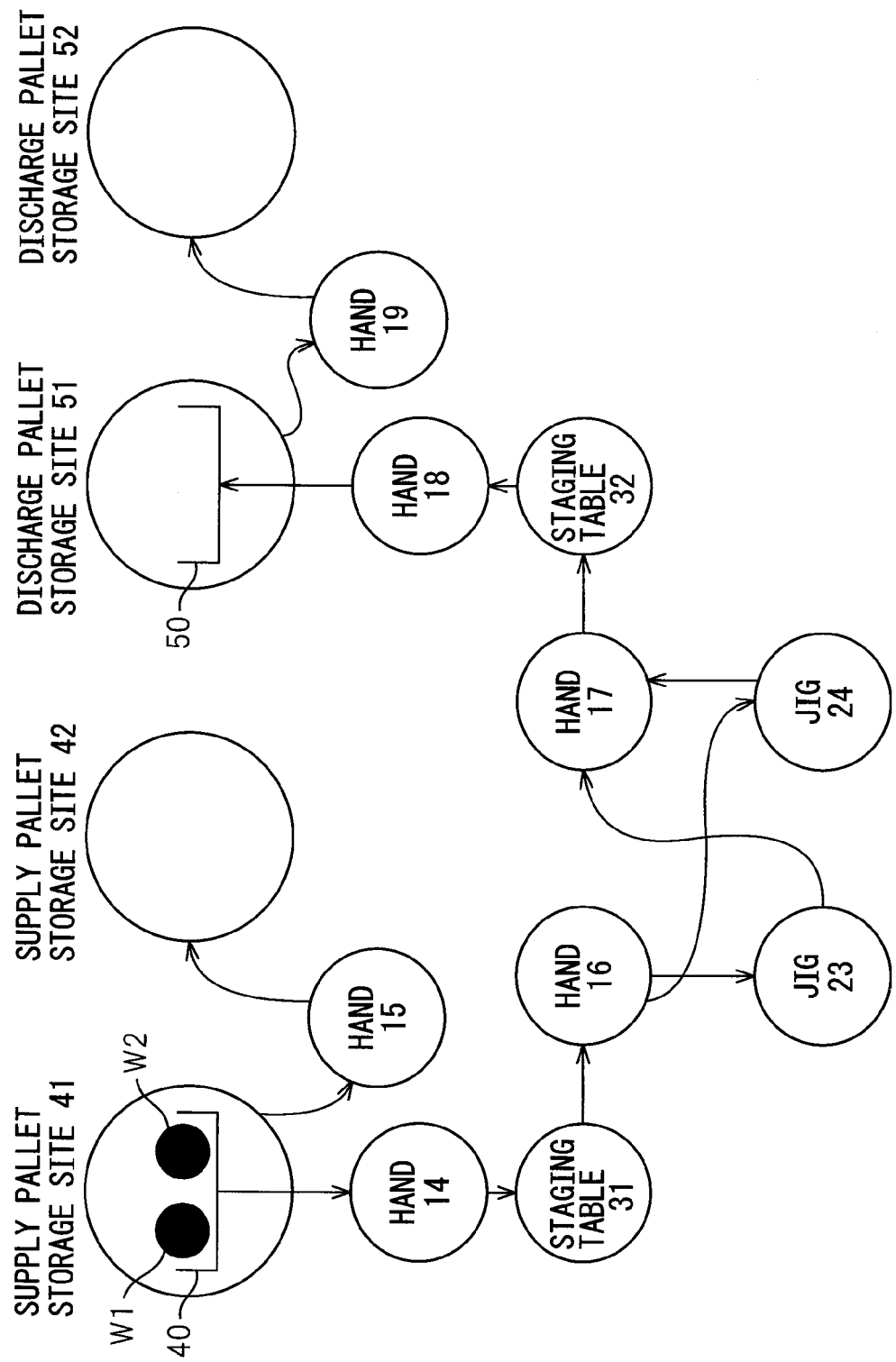
FIG. 4 is a view showing the flow of a workpiece.

Up to here, the components of a certain production system 1 was explained. Next, the dynamic aspects of this production system, that is, the behavior of the production system, will be explained. As will be understood from FIG. 1 to FIG. 3, the behavior of the production system 1 sets the workpieces W1, W2 supplied by a supply pallet 40 by the robots 11 to 13 to the machine tools 21, 22. The machine tools 21, 22 machine the workpieces W1, W2, the machined workpieces W1, W2 are taken out by the robots, then these are placed at the discharge pallet storage sites 51, 52. Further, when the supply pallet 40 becomes empty, the robot makes the supply pallet 40 move to the supply pallet storage site 51 as the discharge pallet 50. When the discharge pallet 50 is filled with workpieces, the discharge pallet 50 is discharged to the discharge pallet storage site 52. FIG. 4 more accurately shows such behavior.

FIG. 4 shows how an element corresponding to a workpiece moves in a production system. A circle in FIG. 4 shows a storage place of an element corresponding to a workpiece, while an arrow mark shows movement of an element corresponding to a workpiece.

For example, the supply pallet storage site 41 has a supply pallet 40 in it. The supply pallet 40 holds the workpiece W1 and workpiece W2. Referring to FIG. 4, the workpiece W1 and workpiece W2 move to the hand 14 of the robot 11, next move to the staging table 31, move from the hand 16 of the robot 12 to the jig 23 or jig 24, further move from the hand 17 of the robot 12 to the staging table 32, and finally move from the hand 18 of the robot 13 to the discharge pallet 50.

Further, FIG. 4 shows a supply pallet 40 moved by a hand 15 of the robot 11 from the supply pallet storage site 41 to the supply pallet storage site 42 and a discharge pallet 50 moved from the discharge pallet storage site 51 to a hand 19 of the robot 13, then moved from the hand 19 to a discharge pallet storage site 52.

In actuality, the workpieces W1, W2 are moved by a robot, but for the purpose of facilitating understanding, FIG. 4 does not show the robot. Further, for the same purpose, FIG. 4 does not show the workpiece W1 or workpiece W2 being machined by the machine tools 21, 22.

Figure 5:
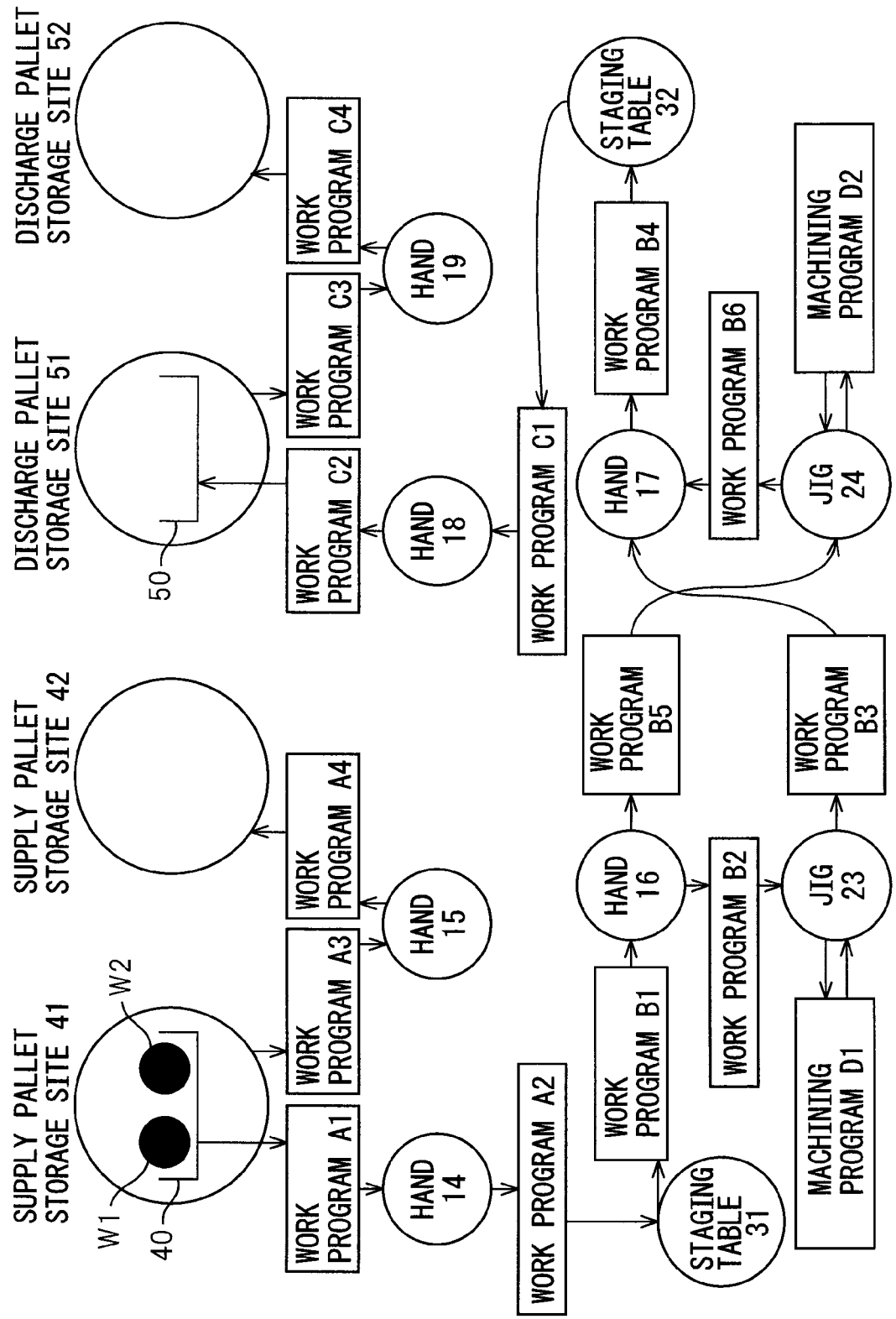
FIG. 5 is a view showing a production system model.

This is illustrated in FIG. 5. In the present invention, the content of FIG. 5 is called a "production system model". In FIG. 5, locations where elements corresponding to workpieces are placed are shown by circles. As locations where elements corresponding to workpieces are placed, in addition to the staging tables 31, 32, there are the robot hands 14 to 19 and jigs 23 and 24.

In FIG. 5, the elements corresponding to the workpieces are shown by black dots or pallet. The black dots show the workpieces W. Pallets 40, 50 can hold inside them workpieces W as individual elements. The rectangular shapes in FIG. 5 show the work programs run by the robots 11 to 13 and the machining programs run by the machine tools 21, 22. The arrow marks in FIG. 5 show the run conditions for executing the work programs or machining programs and the run results realized when the work programs or machining programs end.

Workpieces

In FIG. 5, the block dots show workpieces W. The workpieces W can have the following attributes in the present invention:

(1) . . . Class ID: Number showing type (2) . . . Instance ID: Number unambiguously identifying workpiece (3) . . . Status: Number showing status (machined, not machined, etc.)

The "Class ID" is a number showing the type of workpiece. In FIG. 5, only one type of workpiece is expressed, but if the production system can handle a plurality of types of workpiece as input, these workpieces are classified by the Class ID.

The "Instance ID" is a number unambiguously identifying a workpiece in a group of workpieces of a certain specific type (group of workpieces having same Class ID). This is not an essential attribute.

The "Status" is a number for showing the changing status of a workpiece in the production system. The production system illustrated in the present invention is a production system for machining workpieces, so at the time of input, the workpiece is unmachined, while the output workpiece should be finished being machined. This can be described in the form of designating a not yet machined workpiece as State=1 and a finished machined workpiece as State=2. If one workpiece has to be machined twice, it is possible to treat the State=2 as meaning the completion of the first process of machining and the State=3 as the completion of the second process of machining. If management of the state of the workpiece is unnecessary, the attribute of "Status" need not be used.

Workpiece Storage Places

In FIG. 5, the elements shown by the circles or pallet shapes can have workpieces W placed in them. The storage places of the workpieces have conditions attached to them such as the number of the workpieces W and the type of the workpieces placed at the workpiece storage places. For example, the hand 14 picks up a workpiece W1 or a workpiece W2. The maximum number of workpieces W which the hand 14 can pick up is "1". Further, the type of workpiece able to be picked up is also limited. The hand 14 can only pick up a type of workpiece the same as the workpiece W1 or workpiece W2. This condition is defined as an attribute attached to the workpiece storage places. The method of definition may be of any type, but in the present invention, the following is used for defining it.

Count in 0 . . . 1

Class ID=2

By the above expression, the fact that zero or one workpiece may be placed and it must be Class ID=2 is described. This condition is referred to as a "workpiece condition" in the present invention.

When a workpiece storage place is provided with a sensor, the signal from this sensor and the number or type of workpieces contained in the workpiece storage place in the production system model can be linked. For example, when the sensor attached to the hand 14 can be referred to by the name RC1.RI[1], when that sensor simply notifies the presence/absence of the workpiece by an On/Off signal, the signal of the sensor and the number of workpieces contained at the workpiece storage place can be linked.

RC1.RI[1]=ON->Count>0

RC1.RI[1]=OFF->Count=0

The top formula describes that if RC1.RI[1]=ON, the number of workpieces contained in the workpiece storage place has to be made larger than 0. The bottom formula means that if RC1.RI[1]=OFF, the number of the workpieces must be 0. This formula is called a complementary workpiece condition formula in the present invention.

What should be noted here is that this cooperation is not for finding the number or type of workpieces based on the values of the signals, but shows the conditions which the values of the signals and the number or type of workpieces should satisfy. It only shows the condition that at the instant when RC1.RI[1]=OFF, in the production system model, the number of workpieces contained at the workpiece storage place not become 0, while when RC1.RI[1]=OFF, the number of the workpieces must become 0. Even if RC1.RI[1]=OFF, a situation may arise where the number of workpieces contained in the hand 14 in the production system model is "1".

Further, the information which a sensor can express is often limited. For example, according to the above example, it is possible to detect if the hand 14 has picked up a workpiece or not, but the type of workpiece picked up is not known. Therefore, the signal of the sensor is used to supplement the information of the type or number of workpieces held by the workpiece storage place of the production system model.

Process

In FIG. 5, the work programs of the robots 11 to 13 and the machining programs of the machine tools 21, 22 are shown by rectangles. These are called "processes" in the present invention. Processes have the following attributes.

(1) . . . Character string identifying robot 11 to 13 or machine tool 21, 22 at which process is run (2) . . . Name of process (3) . . . Run status (4) . . . End status and return value For example, the work program A1 corresponds to a program called "PNS0011" run by the robot 11. If not currently being run, it can be expressed as follows:

Controller=Robot 11

Program ID=PNS0011

State=Idle

The "run status" includes the four states of "idle", "running", "pause", and "finished". These respectively show the status where the program is not started up, the status during startup, the status of pausing of the program, and the status where the program ends.

Further, the work programs and machining programs repeat the following two values when the programs end.

(1) . . . Value showing a normal end or abnormal end (end status)

(2) . . . Return value

The end status shows if the work program or machining program has ended normally or ended abnormally. Here, "ended normally" shows the case where a program has ended after being run to its end or where it has ended due to a command for ending the program described in the program in advance. "Ended abnormally" shows the case where the program has been ended at a line where it originally should not have been ended.

In the present invention, it is assumed possible to make some sort of numerical value return when the work program and machining program end. This is called the "return value". The return value is not essential for the production system model. The method of use will be explained later.

Run Conditions and Run Results

FIG. 5 includes two types of arrow marks. One is an arrow mark oriented from a workpiece storage place to a process, while the other is an arrow mark oriented from a process to a workpiece storage place. The arrow mark oriented from a workpiece storage place to a process shows that something is necessary for running a process (run conditions). The arrow mark oriented from a process to a workpiece storage place shows a change occurring after running a process (run results).

Figure 6:
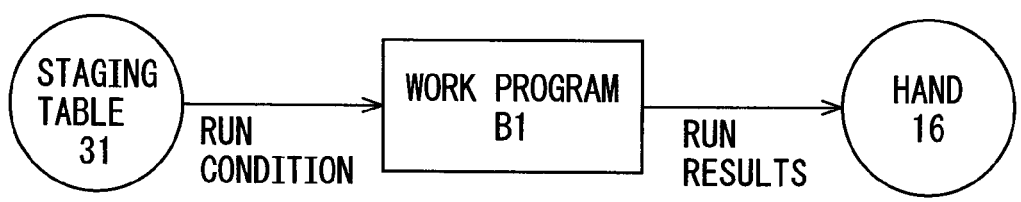
FIG. 6 is a view showing an example of the run conditions and run results.

FIG. 6 is a view showing an example of the run conditions and run results. FIG. 6 extracts a location related to the work program B1 of the robot 12 from FIG. 5. Below, using FIG. 6 as an example, a work program and its run conditions and run results will be explained.

The arrow mark shown in FIG. 6 oriented from the staging table 31 to the work program B1 shows the conditions necessary for running a work program B1 (run conditions). The run conditions can describe the following:

(1) . . . Changes which occur in the number, type, and status of workpieces W on a staging table 31 due to running a program (for example movement of the workpieces)

(2) . . . Statuses of robot, machine tool, and peripherals required for running a program (pre-conditions)

Assuming that the work program B1 handles a workpiece having the Class ID=1 from the staging table 31, the movement of a workpiece included in the run conditions is described as follows:

Count=1

Class ID=1

These formulas do not show that the staging table 31 has a single workpiece, but means that the work program B1 requires one workpiece with the Class ID=1. That is, when the staging table 31 has at least one workpiece with the Class ID=1, the run conditions of the work program B1 are satisfied. Further, when the work program B1 is run, the Class ID=1 workpieces are consumed from the staging table 31 in the number designated by Count. That is, in the above-mentioned example, one workpiece is subtracted from the staging table 31.

The run conditions may describe not only the movement of the workpieces W, but also the pre-conditions. For example, to run this program, the robot 12 has to be at that home position. If the fact of the robot 12 being at the home position is output to the signal RC2.UO[7], this pre-condition is described as follows:

RC2.UO[7]=ON

Next, the run results of this work program B1 will be explained. The work program B1 takes out a workpiece W from the staging table 31 by a hand 16 of the robot 12. Therefore, the run results show that there is one workpiece with the Class ID=1 at the hand 16. This is described as follows:

Count=1

Class ID=1

These formulas show that when the work program B1 ends, one workpiece with the Class ID=1 is added to the hand 16 positioned at the front end of the arrow mark. It should be noted that this arrow mark also does not show the status of the hand 16, but shows movement of the workpiece. That is, this arrow mark is not something meaning the status where the hand 16 has one workpiece with the Class ID=1.

The run results may also describe not only movement of the workpiece, but also the statuses of the robot, machine tool, and peripherals. These are referred to as the "post-conditions". For example, if the robot 12 has to return to the home position when the work program B1 ends, this is described as follows:

RC2.UO[7]=ON

Note that when the work program B1 ends, naturally the sensor attached to the hand 16 should be ON. This may also be described in the post-conditions, but it is more desirable to describe this in the complementary workpiece condition formula of the hand 16 serving as the workpiece storage site.

The work program and machining program have a value showing if the program has ended normally or has ended abnormally and the return value. The return value can be used in a workpiece movement formula in the run results. For example, in a work program for measuring the number of workpieces attached to a robot, the number of workpieces W is returned as that return value. This is entered into the workpiece condition formula as follows:

Count=Return Value

The explanation relating to the run results given up to here is applied to only the case where the end status of all of the work programs and machining programs is normal. If the end status of any work program or machining program is abnormal, the movement of the workpiece described in the workpiece conditions in the run results is not performed.

Running of Process

Here, let us summarize the information shown by FIG. 6. First, the staging table 31 holds information as to how many of what kind of workpieces are placed at that location. The run conditions (arrow marks) show the type and number of workpieces W required for the work program B1 to be run. The work program B1 holds the robot mainly executing it and the name of the program actually run.

The run results (arrow marks) show the type and number of workpieces W output after the work program B1 is run. Further, the hand 16 stores the conditions of type and number of workpieces W which can be placed at the hand 16.

Combining these, the following must be satisfied for the work program B1 to actually be run:

(1) . . . The type and number of workpieces placed at the staging table 21 afterward assuming the work program B1 is run must satisfy the conditions of the staging table 31 relating to the type and number of workpieces.

(2) . . . The type and number of workpieces W placed at the hand 16 afterward assuming the work program B1 is run must satisfy the conditions of the hand 16 relating to the type and number of workpieces.

For example, if the hand 16 has been given the condition Count in 0 . . . 1, when the hand 16 has a workpiece W, the work program B1 cannot be run. The reason is that if running the work program B1, the hand 16 is given on additional workpiece W whereby Count=2. This is because the conditions of the hand 16 are not satisfied.

Similarly, when there is no workpiece W at the staging table 31, if running the work program B1, the workpiece at the staging table 31 becomes "−1". This does not satisfy the conditions of the staging table 31.

For running of this process, a robot and machine tool holding the work program and machining program corresponding to that process can run the programs. For example, the work program B1 is a program run by the robot 12, but when the robot 12 is running another work program, it cannot run the work program B1. This is a self-evident condition, so there is no need to define this in the production system model.

The run conditions and run results can include, in addition to conditions relating to a workpiece moved by a process and the condition that a robot or machine tool for running a program corresponding to that process can run the same, the statuses of the robot, machine tool, and peripherals. For example, to run the work program B1, it is necessary that the robot be present at a certain specific position (here, called the "home position") in advance. If a signal showing that the robot is at the home position can be utilized, this can be added to the run conditions. Further, if whether another robot in the production system is in the middle of operation can be detected by a signal, this may be added to the run conditions.

Summary

Summarizing the above, the production system model shown in FIG. 5 can be said to show the work program and machining program in the production system, how the workpieces are moved by these programs, and where the workpieces are when these programs are run. Such a production system model may be used to express the behavior of the production system. Further, signals from sensors etc. attached to the robot, machine tool, and peripherals may be added to the run conditions of the work program and machining program or added as conditions for verification of the layout of workpieces (number and type) at the workpiece storage place) etc.

The production system model defines the following three conditions:

(1) . . . The workpiece storage place have workpiece conditions and a complementary workpiece condition formula.

(2) . . . The run conditions include a workpiece movement formula and pre-conditions.

(3) . . . The run results include a workpiece movement formula and post-conditions.

Implementing of Production System Model

Figure 7:
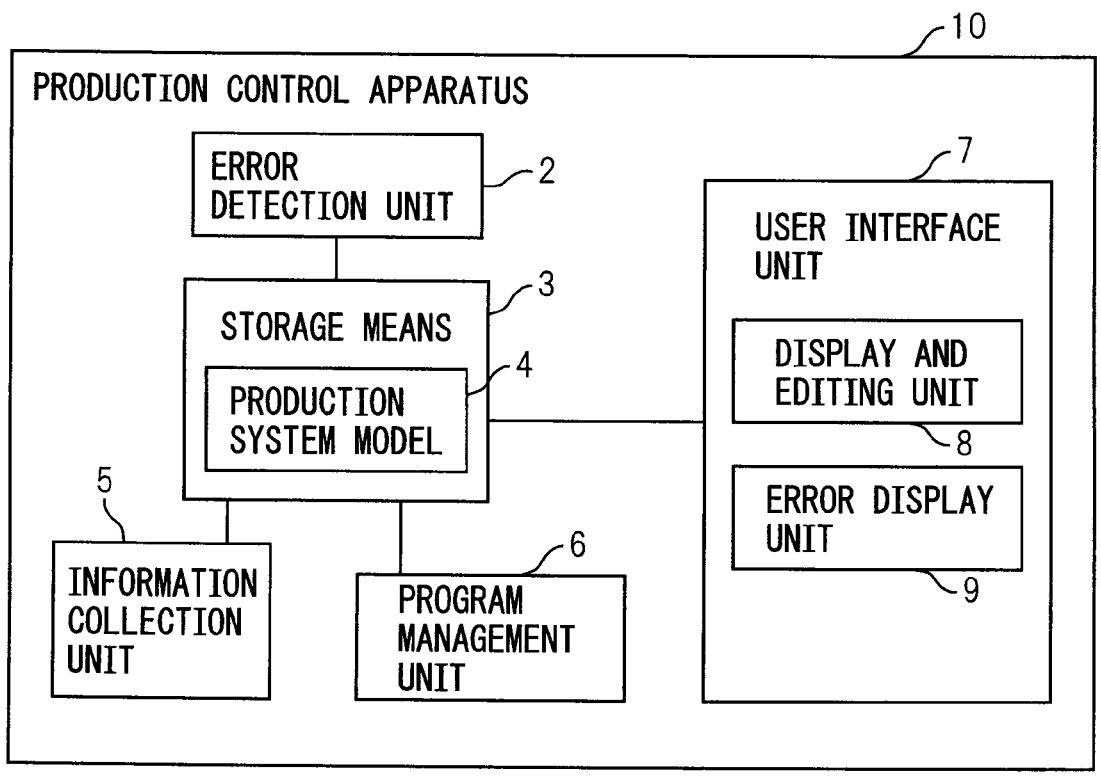
FIG. 7 is a view showing functional modules of a production control apparatus.

Next, the method for realization of a production control apparatus 10 using the production system model described up to here to control the production system will be explained. What controls the production system described by a production system model shown in FIG. 5 is the production control apparatus 10. As shown in FIG. 7, the production control apparatus 10 includes a production system model 4 and a storing means 3 for storing the same, an error detection unit 2, an information collection unit 5, a program management unit 6, and a user interface unit 7. The user interface unit 7 is provided with a display and editing unit 8 and an error display unit 9.

First, the production system model 4 shown in FIG. 7, as explained above, expresses the state of the production system 1. A production system model 4 expressing the content of FIG. 5 in a format which the production control apparatus can handle is stored in the storing means 3. The format of the production system model 4 may be any format, but in the present invention, is stored by the XML format.

The information collection unit 5 updates the production system model 4 based on the run status signals showing the run statuses of the robot and machine tool received by communication with sensors attached to the robots 11 to 13, machine tools 21, 22, and peripherals and workpiece signals expressing the presence/absence of workpieces from the sensors, for example, the sensors 311, 321. The program management unit 6 refers to the production system model 4 and, if there is a runnable work program and machining program, starts up these programs and monitors the run statuses of the started up programs. The error detection unit 2 has the role of monitoring the workpiece storage place or run conditions included in the production system model 4 and conditions relating to the run results and notifying if the conditions stand or not.

Operation of Program Management Unit

Figure 8:
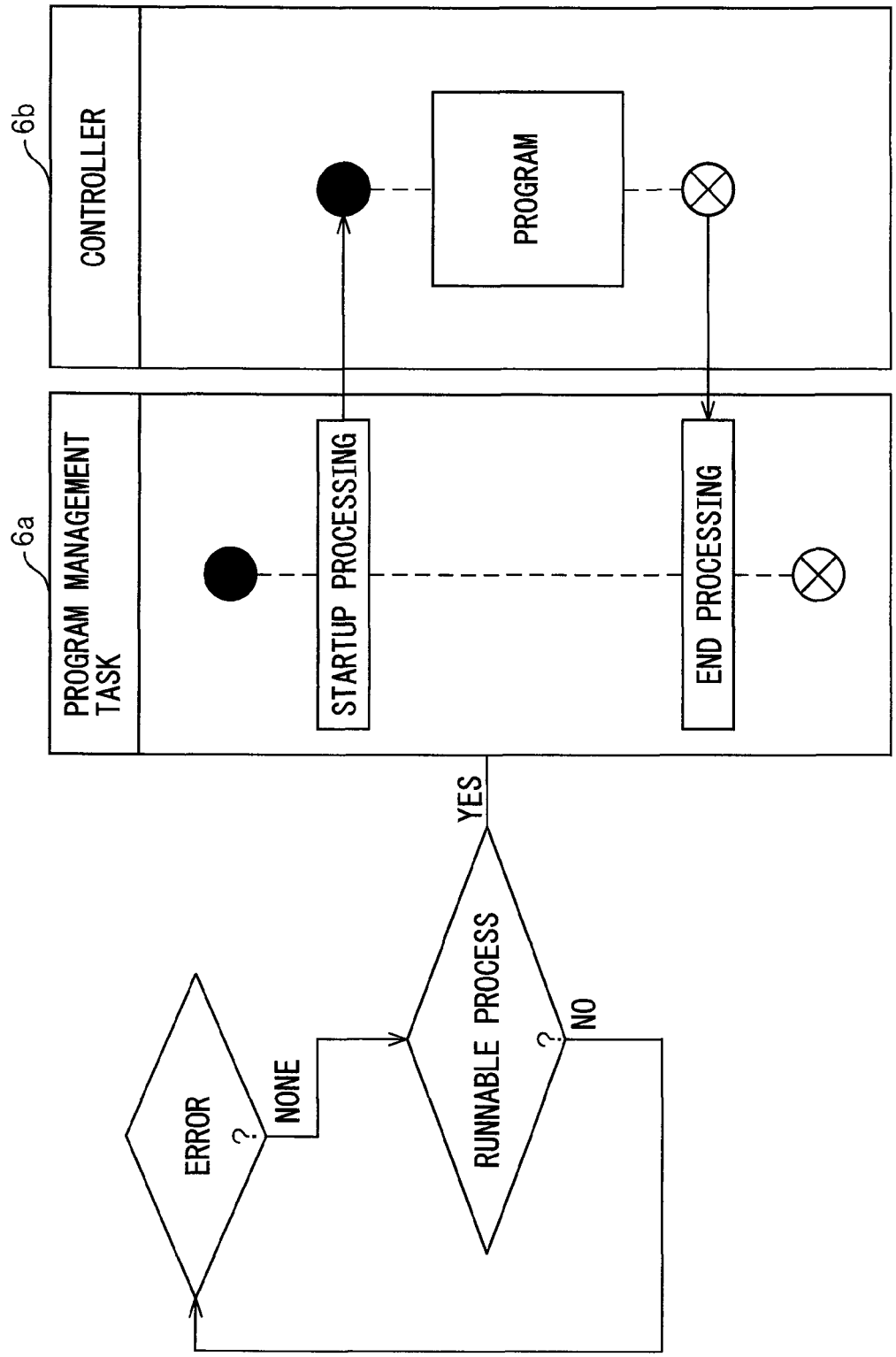
FIG. 8 is a view showing operation of a program management unit.

Details of the program management unit 6 will be explained next. FIG. 8 shows the operation of the program management unit 6. The program management unit 6 refers to the production system model 4 and continues to monitor if there is a runnable program. If there is a runnable program, the program management unit 6 generates a program management task 6a. The generated program management task 6a communicates with the robot and machine tool, instructs the startup of the runnable program, stands by until the started up work program or machining program ends, performs end processing, then cancels itself. Note that when the production system 1 is provided with a plurality of robots 11 to 13 and/or a plurality of machine tools 21, 22, the program management unit 6 may also select the robot and/or machine tool with the runnable program from the plurality of robots 11 to 13 and/or the plurality of machine tools 21, 22.

The judgment as to if there is a runnable program, as explained above, is judgment if the results assuming running of the program satisfy the conditions relating to the input workpiece storage site and the output workpiece storage site, if the robot itself is in a status able to run the program, and if the signals from the sensors attached to the robot, machine tool, and peripherals satisfy conditions linked with the run conditions.

In the startup processing at the program management task 6a, the following are performed.

(1) . . . A workpiece is deleted from the input workpiece storage site in the production system model 4 according to the run conditions of the program.

(2) . . . Startup of the program is instructed to the robot or machine tool running the program.

At the time when a program management task 6a is generated, the fact of the selected program satisfying the run conditions has already been confirmed by the program management unit 6, so there is no need for the program management task 6a to investigate the run conditions of the program.

In the end processing at the program management task 6a, the following are performed:

(1) . . . A signal indicating the end of the program is received from the robot or machine tool running the program.

(2) . . . A workpiece is added to the workpiece storage site forming the output at the production system model in accordance with the run results of the program.

This action will be explained using FIG. 6. First, the staging table 31 has one workpiece W with the Class ID=1. Assume a state where the hand 16 does not have any workpiece and the robot 12 is not running any work program. At this time, the work program B1 can be run, so the program management unit 6 generates a program management task 6a to run the work program B1.

The program management task 6a performs startup processing. First, it takes out a workpiece W from the staging table 31 at the production system model 4. Due to this, at the production system model 4, there are zero workpieces W placed at the staging table 31. Next, the program management task 6a communicates with the robot 12 and instructs running of the work program. Note that at this instant, in the actual production system, needless to say the workpiece W placed at the staging table 31 does not move.

Figure 9:
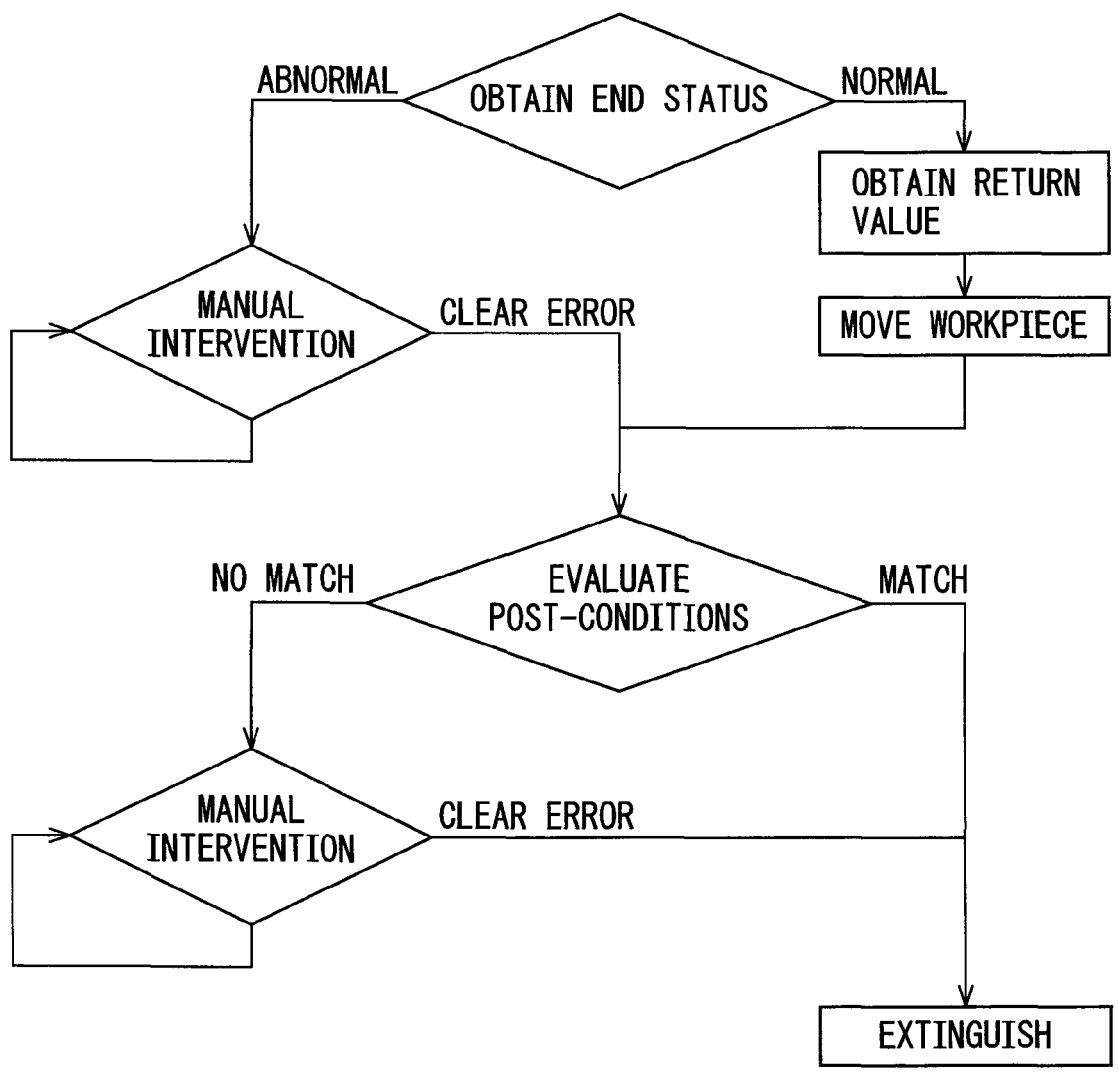
FIG. 9 is a view showing details of end processing.

When run status of the program at the robot 12 changes from "running" to "finished", the program management task 6a acquires the end status of the program. As shown in FIG. 9, if the end status is normal, the program management task 6a further acquires a return value. Further, the program management task 6a adds one workpiece to the hand 16 of the production system model 4 (corresponding to "movement of the workpiece" in FIG. 9) and changes the status of the program from "finished" to "idle". Due to this, a workpiece is placed in the hand 21 of the production system model 4.

When the post-conditions are defined, as shown in FIG. 9, the program management task 6a evaluates the match between the current status of the production system and the post-conditions right after this. Further, when matching, the program management task 6a is extinguished.

On the other hand, when the end status is abnormal, as shown in FIG. 9, the program management task 6a does not acquire the return value and leaves the status of the program as "finished". Further, the post-conditions are not evaluated and the program management task 6a itself is not extinguished. In this case, the post-conditions are evaluated only when the operator uses the display and editing unit 8 to manually clear error (please see FIG. 9).

A plurality of program management tasks 6a can be generated at the same time. That is, if a plurality of processes can be run, exactly that number of program management tasks 6a can be generated and the work programs and/or machining programs run. As shown in FIG. 1, the production system 1 illustrated here has three robots 11 to 13 and two machine tools 21, 22, so if the conditions are satisfied, a maximum of five processes can be run in parallel.

Operation of Information Collection Unit

Figure 10:
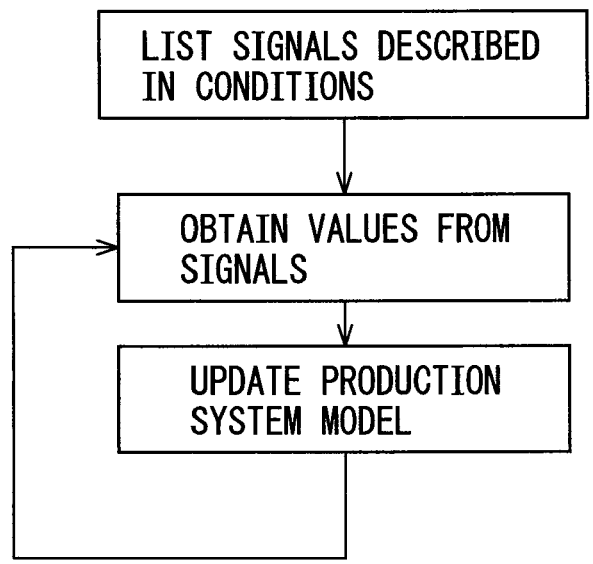
FIG. 10 is a view showing operation of an information acquiring unit.

The information collection unit 5 is simple in configuration. As shown in FIG. 10, the information collection unit 5 reads the production system model 4 at the time of startup of the production control apparatus 10 and prepares a list of signals described in the conditions. As explained above, there are three types of signals which can be described as conditions in a production system model 4: conditions of the workpiece storage site, run conditions of a process, and run results of a process. The signals which the production system model 4 must monitor are extracted from all of the workpiece storage sites and all of the processes described in the production system model 4. This list of signals, for example, becomes as follows:

(1) . . . Signal of sensor 311 showing presence/absence of workpiece W on staging table 31

(2) . . . Signal of sensor 321 showing presence/absence of workpiece W of staging table 32

(3) . . . Signal of sensor 141 showing presence/absence of workpiece W of hand 14

(4) . . . Other signals

In the apparatuses to which these sensors are attached, the sensors can be referred to by unique alphanumeric strings. For example, if the sensor attached to the hand 14 of the robot 11 can be referred to in the robot 11 by the alphanumeric string RI[1], the production control apparatus 10 can refer to this signal by the alphanumeric string Robot1.RI[1]. Note that the transfer of signals among the production control apparatus 10, robots 11 to 13, production control apparatus 10, and machine tools 21, 22 can be easily realized by various methods, so the explanation of the specific method will be omitted.

Operation of Error Detection Unit

Figure 11:
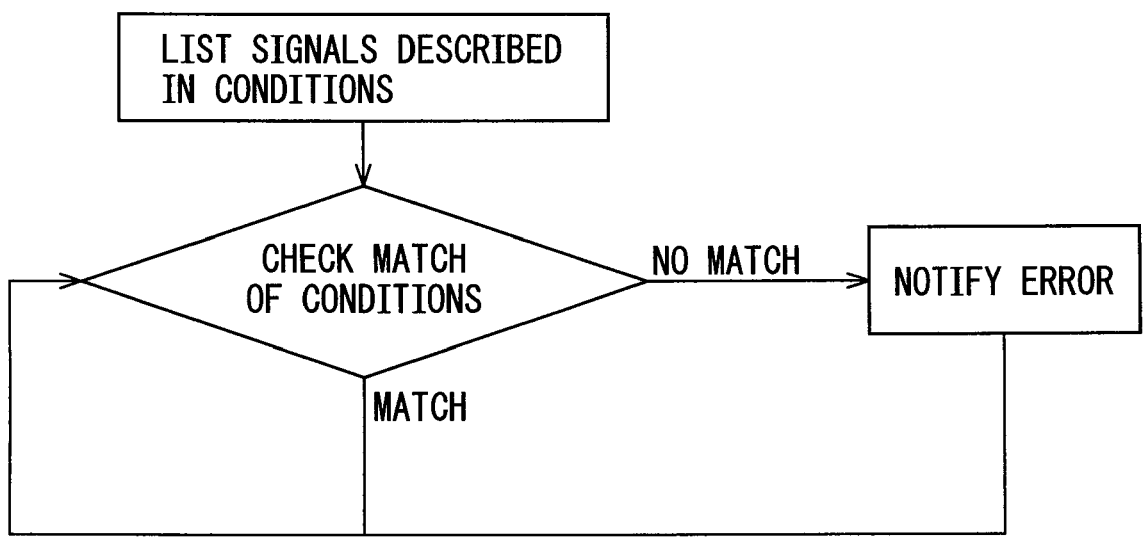
FIG. 11 is a view showing operation of an alarm notification unit.

The error detection unit 2 periodically evaluates the conditions defined by the production system model 4 and notifies the existence of error in the following two cases (FIG. 11).

(1) . . . when workpiece conditions do not satisfy complementary workpiece condition formula.

(2) . . . when there is a process which does not end normally (when the end status is abnormal and when post-condition included in run results is not satisfied)

The former shows that the movement of the workpiece defined by the production system model 4 and the signals from the sensors attached to the production system do not match, while the latter shows that the status of the production system differs from the desired results without regard as to movement of the workpiece.

An example of the case where the workpiece conditions do not satisfy the complementary workpiece condition formula is for example as follows. In FIG. 6, the work program B1 is run and the workpiece should be in the hand 16 in the production system model 4, but in actually the robot 12 has dropped the workpiece in the middle and the signal of the sensor 161 attached to the hand 16 has become OFF.

Further, when the end status of the process is abnormal, this is treated as an error. As such an example, for example, in the middle of running the work program B1 in FIG. 6, something causes the work program B1 to end. As the cause for this, a situation where the robot 12 strikes an unexpected obstacle or a situation where the operator of the production system manually stops the robot 12 midway may be considered.

As an example in the case where part of the run results, that is, the post-conditions, are not satisfied, for example, in FIG. 6, there is the case where the robot 12 is not at the home position when the work program B1 ends.

Figures 12, 13:
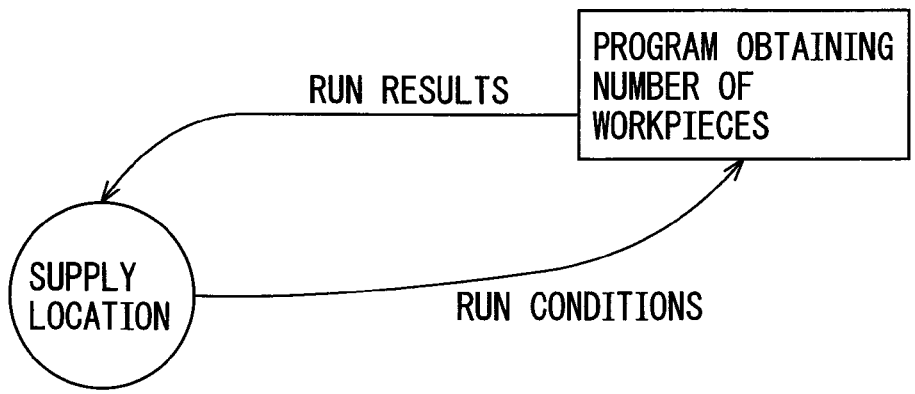
FIG. 12 is a view showing the supply of workpieces.
FIG. 13 is a view showing display content of mismatch of conditions.

Note that sometimes the pre-conditions are not satisfied, so the work program or machining program cannot be run. This is not an abnormal situation, but is a situation where the production system will not operate as expected. To show this situation to the operator of the production system, the production control apparatus 10 can display the mismatch of the pre-conditions for any work program or machining program on the error display unit 9. In FIG. 13 showing an example of the error display unit 9, while the signal "PLC.DO[3]" should be ON, it is actually OFF. The operator of the production system can view this screen and obtain hints for overcoming the problem. Note that the letters A to G in FIG. 13 show work programs or machining programs shown in FIG. 5.

Operation of User Interface Unit

The user interface unit 7 is comprised of a display and editing unit 8 for displaying and editing a production system model 4 and an error display unit 9 showing the cause when an error occurs.

In the display and editing unit 8, it is possible to manually change the number, type, and statuses of the workpieces contained at a workpiece storage place of the production system model 4. Further, in the display and editing unit 8, when the result of running the process (program) is abnormal, the operator can manually return the abnormality to the normal state. The error display unit 9, as already shown with reference to FIG. 13, displays the match of the pre-conditions and post-conditions of the process and workpiece condition and the complementary workpiece condition formula.

Operation of Production System

A typical method of operation of the production system 1 using the production control apparatus 10 provided with the production system model 4 explained up to here will be described.

Loading of Workpieces

When this production system operates, first, workpieces are necessary. The operation starts with workpieces present at the workpiece storage place in the production system model 4. There are two methods for loading workpieces into the production system model 4.

(1) . . . Using the function of the manual editing unit of the production control apparatus to add workpieces to the workpiece storage place in the production system model 4.

(2) . . . Running a program having the function of loading workpieces when some sort of peripheral can detect the number or type of the workpieces present at the workpiece storage place.

The former is originally a simple method. In this method, the operator of the production system just manually performs the operation of loading workpieces into a workpiece storage place in the production system model 4. However, this method is a manual operation, so cannot be used for an unmanned operation production system.

To operate the production system unmanned, it is necessary to be able to obtain information on the number or type of workpieces from the peripherals, PLC, etc. If such a production system, a work program for obtaining this information can be run to load workpieces into the production system model 4. For example, consider a production system linked with a warehouse. In this example, the warehouse and the production system transfer signals as follows:

(1) . . . The warehouse sends a signal showing the number of workpieces when supplying workpieces to the production system.

(2) . . . The warehouse turns the signal showing the supply of workpieces ON when supplying workpieces to the production system.

(3) . . . When a signal from the production system to the warehouse showing that the number of the workpieces has been obtained has turned ON, the signal from the warehouse showing the supply of workpieces is turned OFF.

For such a warehouse, the production system side provides a work program for obtaining the number of workpieces and shows the supply location where the warehouse supplies the production system with workpieces as the workpiece storage place in the production system model 4 (see FIG. 12). At this time, in the production system model 4, it is defined that, when the signal from the warehouse is ON, a program for obtaining the number of workpieces from the warehouse is run. When the signal from the warehouse can be expressed by the alphanumeric string PLC.DI[1], this condition can be described as follows as the run conditions of the work program:

Workpiece movement formula: None

Advance condition PLC.DI[1]=ON

This work program obtains the number of workpieces from the warehouse and sends a signal to the warehouse that it has obtained the number of workpieces. The number of workpieces is returned as a return value. At this time, the run results are shown by the following formula:

Workpiece Movement Formula Count=Return Value

Post-Condition PLC.DI[1]=OFF

Due to this, when a signal arrives from the warehouse, behavior of obtaining the number of workpieces is realized.

Normal Operation

In the production system model 4, when workpieces are loaded, the program management unit 6 starts up the runnable work program and machining program. As a result of running the work program and machining program, the workpiece moves in the production system model 4. This operation continues until there is no longer any runnable work program and machining program. Usually, the state where there is no runnable program is the state where all of the work on the workpiece has been finished and the workpieces have all moved to the discharge location.

Discharge of Workpieces

The workpieces can be discharged, in substantially the same way as the supply of workpieces, by manually removing it from the production system model 4 or running a program having the same action.

Occurrence and Detection of Error

In the production system explained in the present invention, the following errors can be detected:

(1) . . . Case where work program and machining program have ended normally (A) Case where work program and machining program end abnormally (B) Case where work program and machining program end normally, but in the production system model 4, post-conditions of the run results of the work program and machining program do not match (2) . . . Case where in production system model 4, workpiece conditions linked with workpiece storage place and complementary workpiece condition formula do not match The error of the work program and machining program not ending normally shows that running the work program and machining program did not result in the expected situation. In this error, the timing of generation of the error is the time of end of the program.

In the production system model 4, the error of workpiece conditions linked with the workpiece storage place and the complementary workpiece condition formula not matching shows that the model of the production system, that is, the production system model 4, and the situation of the actual production system do not match. This error can occur at any time.

The present invention is characterized by giving the production system management apparatus a production system model 4 and detecting error by comparing this model and status of the actual production system. By the system of comparing the model and the actual production system, it becomes possible to obtain a grasp of even the flow of the workpieces and detect error. Further, as explained later, it is possible to easily restore the system from the error state.

Note that in addition to the above two errors (1), (2), sometimes an alarm occurs during the operation of the work program and machining program, but at this point of time this is not treated as error in the present invention. For example, assume that a certain robot strikes some sort of obstacle while running the work program, an alarm is generated, and the work program is paused. This state is just one where in the production system model 4, the run status of the corresponding work program changes from "running" to "paused". In this state, if removing the obstacle and restarting the work program, the production system can continue operation, so this is not treated as error in the present invention. However, when ending the work program in this state, this means abnormal ending. This corresponds to one of the definitions of error in the present invention.

Restoration from Error Status

When an error occurs in the production system according to the present invention, it is cleared by the next routine. It is necessary to first deal with the error in the case where the work program or machining program does not end normally. Abnormal end of the work program or machining program occurs when for example the operator instructs ending in the middle. Alternatively, an abnormal end of the work program or machining program occurs when the power of the robot or machine tool goes down while running the program and thereby the program stops midway and subsequent running cannot be continued.

In each case, the error clearing work by the operator is manual operation of the robot or machine tool so as to satisfy the post-conditions of the run results of the abnormally ended program. For example, when the robot hits some sort of obstacle and the work program abnormally ends, the position of the robot arm naturally differs from the position in the case of normal ending and the post-conditions are not satisfied. Therefore, the operator manually operates the robot to make it move to the position in the case where the program would have ended normally. Due to this restoration work, the result becomes the same state as when the work program of the robot or machining program of the machine tool ends normally.

Next, if the placement of the workpiece differs between the model and the actual system, this error has to be cleared. There are two methods for restoring the system from this error. One restoration method is to make the workpiece information in the production system model 4, that is, the type, number, and machined statuses of the workpieces, match with the status of the workpieces in the actual production system. Another restoration method is to change the status of the actual production system to make the status of the actual production system match the production system model 4. Whichever means is used, it is sufficient just to make the model and actual status match.

In the error status, the operator of the production system can display on the error display unit 9 where the model and the actual production system do not match. This screen includes the following information.

(1) . . . If there is a process ending abnormally, the name of that process (2) . . . The part in the production system model 4 not matching the post-conditions of the run results of the work program and machining program (3) . . . The part where the workpiece condition linked with the workpiece storage place and the complementary workpiece condition formula do not match Specifically, the error display unit 9 displays the name of the process if the process ends abnormally and displays the run status signal when, despite the process ends normally, the post-conditions of the process defined by the production system model and the newest run status signal received through the communicating means 60 do not match. Further, the error display unit 9 displays the workpiece signals when the workpiece information of the production system model 4 updated by the results of the process does not satisfy the complementary workpiece condition formula according to the newest workpiece signal received through the communicating means 60.

For example, FIG. 6 shows a program enabling a robot 12 to pick up a workpiece from a staging table 31 by a hand 16. Assume that as a result of running this program, the program ends normally, but that the workpiece drops from the hand 16. At this time, in the production system model 4, the workpiece is held at the hand 16, but this differs from the actual status. It is detected as error if the workpiece information in the production system model does not satisfy the complementary workpiece condition formula by the newest workpiece signal. The production control apparatus 10 then notifies the operator of the production system that the production system model and the actual production system do not match at the hand 16.

Here, if making the actual system match the production system model 4, the operator of the production system may pick up the workpiece and make the hand 16 hold it. Due to this, the production system model and the actual production system match.

When making the production system model 4 match the actual production system, it is also possible to delete the workpiece at the hand 15 of the production system model 4. Alternatively, in the actual system, it is also possible to reset the workpiece on the staging table 31 and make the workpiece move from the hand 16 to the staging table 31 on the production system model 4. With each method, the simplest method can be selected.

Restart after Restoration

If error occurs, the program management unit 6 stops the program selection operation. However, even in this state, the information collection unit 5 continues operating, so the production control apparatus monitors if the production system remains in the error state and the error state is clear. In the above-mentioned example, up until the mismatch between the model at the hand 21 and the actual production system is cleared, the production control apparatus 10 will not accept any instruction for restart from the operator of the production system.

That is, the production control apparatus 10 makes the production system 1 operate again only when the process in the production system model 4 having normally ended is confirmed by the newest run status signal received through the communicating means 60 and the workpiece information in the production system model 4 is confirmed by the newest workpiece signal received through the communicating means 60.

When the operator of the production system works so that the model matches the actual status and the error status is cleared, the production control apparatus 10 receives the instruction for restart, and the program management unit 6 restarts the selection operation of the program. In the above-mentioned example, when making the hand 16 pick up a dropped workpiece, a runnable program is started up from that status. Alternatively, if placing the workpiece on the staging table 31, a work program B1 is run for again obtaining a workpiece from the staging table 31. Alternatively, the display and editing unit 8 of the production control apparatus 10 may be used to enable the operator to manually return an abnormality (error state) to a normal state.

In a general production system, it is necessary to pay attention to the resumption of operation after some sort of manual intervention in the production system. The reason is that as a result of manual intervention, there is no means for judging if the production system is in the expected status. As opposed to this, in the production system of the present invention, whether or not a work program (or machining program) can be run is judged by the run conditions. Therefore, in the production system of the present invention, regardless of any manual intervention, so long as the production system is not in a standby status, the program cannot be called up. Therefore, even after the manual intervention of restoration from error, it is possible to safety resume operation of the production system.

Typical embodiments were used to explain the present invention, but it will be understood that a person skilled in the art can make the above changes and various other changes, deletions, and additions without departing from the scope of the present invention.

The invention claimed is:

1. A production system provided with
a production control apparatus controlling a production process in the production system,
at least one machine tool including a plurality of machining programs and machining a workpiece,
at least one robot including a plurality of work programs, supplying a workpiece to said machine tool, and unloading said workpiece from said machine tool, at least one staging table on which said workpiece can be placed,
at least one detector outputting a workpiece signal indicating if a workpiece is present at said staging table, and
a communicating means for connecting said production control apparatus, said robot, said machine tool, and said detector, wherein, said production control apparatus is provided with
a storing means for storing in advance a production system model comprised of workpiece information regarding said workpiece and program information regarding said plurality of work programs of said at least one robot and said plurality of machining programs of said at least one machine tool,
an updating means for updating workpiece information and program information contained in said production system model stored in said storing means based on a run status signal received from said communicating means and showing a run status of said robot and said machine tool and a workpiece signal output from said detector, and
an instructing means for selecting one work program from said plurality of work programs of said robot and one machining program from said plurality of machining programs of said machine tool based on the production system model updated by said updating means and instructs running of the selected work program and machining program through said communicating means to said robot and said machine tool.

2. A production system as set forth in claim 1, wherein said production system is comprised of a plurality of said robots and a plurality of said machine tools, and said instructing means further selects one robot among said plurality of robots and one machine tool among said plurality of machine tools based on the production system model updated by said updating means and instructs running of said work program and machining program through said communicating means to said selected robot and machine tool.

3. A production system as set forth in claim 1 or 2, wherein when said production system stops due to an error, said production control apparatus makes said production system operate again only when said program information in said production system model matches a newest run status signal received by said communicating means and said workpiece information in said production system model matches a newest workpiece signal received from said communicating means.

4. A production system as set forth in claim 3, wherein said production control apparatus is provided with a displaying means for displaying the run status signal when said program information in said production system model and said newest run status signal do not match and displaying the workpiece signal when said workpiece information in said production system model and said newest workpiece signal do not match.

5. A production system as set forth in claim 3, wherein said production control apparatus is provided with a changing means for changing said production system model and makes said production system operate again when said program information in said production system model and said newest run status signal match and said workpiece information in said production system model and said newest workpiece signal match due to said changing means.

* * * * *